United States Patent Office 3,222,290
Patented Dec. 7, 1965

3,222,290
OPTICAL BRIGHTENING OF POLYSTYRENE AND POLYOLEFINS
Harry Braus, Springdale, and Fred D. Waas, Cincinnati, Ohio, assignors to National Distillers and Chemical Corporation, New York, N.Y., a corporation of Virginia
No Drawing. Filed Oct. 17, 1962, Ser. No. 231,275
25 Claims. (Cl. 252—301.2)

This invention relates to plastic compositions of matter having improved properties with respect to optical brightness.

The yellowish appearance in daylight of many plastics and resin limits their application for both practical and esthetic reasons. Consequently, there has been considerable activity in the field relating to the discovery of compounds which will, when incorporated into a resin or plastic, convert the ultra-violet light impinging thereon into blue fluorescent light thereby imparting permanently to the resin or plastic a whiter and/or brighter appearance in daylight. Such compounds or additives are known as optical brighteners.

To function satisfactorily as an optical brightener for plastic or resins, a material must first be capable of fluorescing in the region of ultra-violet light present in normal sunlight. The material must also be compatible with the resin or plastic, and must remain stable under the conditions to which the resultant composition is subjected. The material must not introduce into the resin undesirable residues or properties which will have a deleterious effect on the original desirable properties of the resin or plastic. The material must not undergo harmful side reactions or bleed out of the medium being protected. It must be colorless and odorless or nearly so, and insoluble in water. For an economic standpoint, the optical brightener should be capable of synthesis from readily available starting materials by a relatively simple process so as to be inexpensive; it should also be effective in small quantities relative to the quantity of plastic or resin.

Accordingly, it is one object of this invention to provide novel plastic compositions of improved optical brightness.

It is a further object of this invention to prepare novel plastic compositions of improved optical brightness by incorporating into a plastic a small amount of a compatible, stable, and relatively inexpensive compound.

It has now been found that new and novel plastic compositions of improved optical brightness are produced by incorporating into a plastic a small amount of a compound corresponding to the general formula

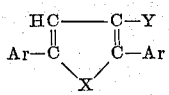

wherein X can be sulfur, oxygen, or NH, Y can be hydrogen or the group

(wherein R can be hydrogen or an alkyl radical of from 1 to about 22 carbon atoms, preferably, from 1 to about 3 carbon atoms), and Ar can be an aromatic radical such as phenyl, naphthyl, phenanthryl, and anthranyl, and the like. Suitable compounds include 2,5-diphenylfuran, 2,5-diphenylpyrrole, 2,5-diphenylthiophene, 3-acetyl-2,5-diphenylthiophene, 2,5-dinapthylthiophene, 2,5-dinaphthylfuran, 3-propionyl, 2,5-diphenylthiophene, 2,5-dinapthylpyrrole, etc. Such compounds fluoresce in ultra-violet and near ultra-violet light, are compatble with various plastics and when incorporated in small amounts in these plastics result in stable compositions of improved optical brightness.

The 2,5-diarylthiophene of this invention may be prepared from the reaction of a 1,4-diarylbutane or 1,4-diarylbutadiene with sulfur, an inorganic sulfide such as $P_2S_3$ or $P_2S_5$, an organic sulfide such as benzothiazyl disulfide, or the like. By means of this procedure, for example, 1,4-diphenylbutane or 1,4-diphenylbutadiene may be converted to 2,5-diphenylthiophene by refluxing with 4 or 2 moles, respectively, of sulfur.

The 2,5-diarylfurans of this invention may convenietly be prepared by dehydrating the appropriate 1,2-diaroylethane. The 1,2-diarolylethane can be obtained from a Friedel-Crafts reaction of the appropriate arene with fumaryl chloride, followed by reduction.

The diarylpyrroles of this invention may be prepared from the reaction of the appropriate 1,2-diaroylethane with ammonium acetate, ammonia, or formamide.

Introduction of an alkoyl group onto the 3-position of the 2,5-diaroylfuran can be carried out according to the procedure of Lutz and Rowlett, Jr., J.A.C.S., 70, 1359 (1948), wherein 2,5-diphenylfuran is acetylated with acetic anhydride in the presence of stannic chloride as a catalyst. Similarly, the 2,5-diarylfuran, as well as the 2,5-diarylpyrrole and the 2,5-diarylthiophene, can be acetylated in the 3-position by acetylating with the appropriate alkoyl chloride in the presence of a stannic chloride catalyst.

The 2,5-diaryl compounds utilized in the present invention are stable, odorless, colorless solids which are insoluble in water and soluble in certain common organic solvents, e.g., chlorobenzene, chlorotoluene, etc. They may be conveniently prepared from readily available starting materials by means of simple known processes. They are compatible with resinous and plastic compositions of various types, such as polyolefins, as for example, polyethylene and polypropylene, polystyrene, polyvinyl chloride, acrylonitrile polymers, acrylates such as methyl acrylate and methyl methacrylate, as well as coplymers and terpolymers of the foregoing, and the like. The incorporation of a small amount of one or more of these compounds into a resinous composition provides a novel composition which, under sunlight, appears whiter and/or brighter than the original resin. The effect is particularly noticeable and of great commercial importance for resin compositions normally exhibiting a yellowish appearance in sunlight. The addition of one or more of these compounds does not, however, inhibit in any way the gelatin and cure rate of the resinous material. The enhancement of whiteness and/or brightness without deterioration of other desirable physical properties is particularly important when dealing with a resinous material which is intended to be fabricated into an article of clothing, such as rainwear, into a packaging film for foods or the like, or into rigid molded implements or decorative items, such as food containers, radio cabinets, etc. where whiteness or brightness or the absence of a yellowish tint is of considerable concern to commerce.

In general, the amount of the 2,5-diaryl compound utilized for incorporation into the plastic compositions which are to be optically brightened may be varied depending on the desired improvement in optical brightness as well as the efficiency of the particular compound employed. Generally, the stated 2,5-diaryl compounds may be used in amounts of from about 0.01% to about 1.0% by weight of the plastic, and preferably in amounts of from 0.05 to 0.2%.

The 2,5-diaryl compound may be incorporated into the polymer by any of several methods known to those skilled in the art for providing a uniform mixture of a plastic and additive material. Such methods include the addition of the stated 2,5-diaryl compounds as solids, as solutions in inert solvents, or as slurries in non-solvents, to the plastic in either dry fluff or molding powder form followed by drying and tumbling. The stated 2,5-diaryl compounds may also be incorporated into the plastic by melt blending the ingredients in conventional apparatus, such as a Banbury mixer, heated rolls etc. It is also possible to incorporate the stated 2,5-diaryl compounds into a plastic (e.g., polystyrene) by adding it to the monomer prior to polymerization, and then conducting the polymerization in the presence of the optical additive.

The following are typical examples of the application of this invention. It is not intended, however, that the invention be strictly limited thereto. Except where otherwise specified, all parts are given by weight.

*Example I*

To 100 parts of styrene monomer was added 0.1 part of 3-acetyl-2,5-diphenylthiophene followed by 0.05 part of benzoyl peroxide catalyst. Polymerization commenced, and was carried out over a period of about 6 hours at a temperature below 100° C. The resultant polymer was a colorless, transparent solid. When placed under an ultra-violet lamp, the polymer exhibited a blue fluorescence. Polystyrene prepared in the same manner, but without the 3-acetyl-2,5-diphenylthiophene, had a pale yellow color. No fluorescence was observed under an ultra-violet lamp.

*Example II*

Example I was repeated using as the optical brightener 2,5-diphenylthiophene. The polystyrene obtained was colorless and transparent and under an ultra-violet lamp exhibited a blue fluorescence. Polystyrene prepared without the optical brightener did not show any fluorescence.

*Example III*

Example I was repeated using as the optical brightener 2,5-diphenylfuran. A clear, transparent polystyrene was produced. When exposed to radiation from an ultra-violet lamp, it exhibited a blue fluorescence. Polystyrene prepared without the optical brightener did not show any fluorescence.

*Example IV*

Example I was repeated using as the optical brightener 2,5-diphenylpyrrole. The resultant polystyrene was clear and transparent. Under an ultra-violet lamp it gave off a blue fluorescence. Polystyrene prepared without the optical brightener did not show fluorescence.

*Example V*

1.5 parts of 2,5-diphenylthiophene was milled into 300 parts of a commercial polyethylene (density, 0.917 g./cc.; melt index, 2.0) using a heated roll mill at a temperature of 275° to 300° F. The resultant plastic sheet was uniformly white in appearance. When compared visually with a sheet of the polyethylene prepared in the same manner without 2,5-diphenylthiophene, the sheet containing the additive was noticeably whiter and brighter in appearance. When exposed to an ultra-violet lamp, the polyethylene with additive emitted a blue fluorescence; the polyethylene without, did not.

*Example VI*

Example V was repeated except that 0.5 part of 2,5-diphenylthiophene was used with 300 parts of the polyethylene. The resultant plastic sheet was noticeably whiter and brighter than the untreated control, and emitted a blue fluorescence under an ultra-violet lamp.

*Example VII*

1.5 parts of 2,5-diphenylthiophene was uniformly blended with 300 parts of a commercial polypropylene (density 0.904 g./cc.; melt index 3.0 at 230° C.) by means of a heated roll mill at a temperature of 330° to 340° F. The resultant plastic sheet had a uniform white appearance in normal daylight. When compared visually with a sheet of untreated polypropylene, the sheet containing additive appeared markedly whiter and brighter. When exposed to an ultra-violet light, the polypropylene with additive gave off a blue fluorescence; the polypropylene without additive did not fluoresce.

What is claimed is:

1. A modified resinous composition consisting essentially of a plastic from the group consisting of polystyrene, a polymer of an aliphatic olefin, and a copolymer of styrene and an aliphatic olefin, and a small amount of a compound having the structural formula

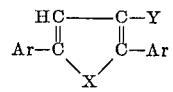

wherein X represents a member of the group consisting of sulfur, oxygen, and NH, Y represents a member of the group consisting of hydrogen and

wherein R is an alkyl radical of from 1 to about 22 carbon atoms and Ar represents an aryl radical derived from a hydrocarbon having from 1 to 3 six-membered carbocyclic rings, said rings being fused when there is more than one ring, said composition having the property of improved optical brightness.

2. A resinous composition consisting essentially of a plastic from the group consisting of polystyrene, a polymer of an aliphatic olefin, and a copolymer of styrene and an aliphatic olefin, and a small amount of 2,5-diphenylthiophene said composition having the property of improved optical brightness.

3. A resinous composition consisting essentially of a plastic from the group consisting of polystyrene, a polymer of an aliphatic olefin, and a copolymer of styrene and an aliphatic olefin, and a small amount of 2,5-diphenylfuran said composition having the property of improved optical brightness.

4. A resinous composition consisting essentially of a plastic from the group consisting of polystyrene, a polymer of an aliphatic olefin, and a copolymer of styrene and an aliphatic olefin, and a small amount of 2,5-diphenylpyrrole said composition having the property of improved optical brightness.

5. A resinous composition consisting essentially of a plastic from the group consisting of polystyrene, an aliphatic polyolefin, and mixtures thereof and a small amount of 3-acetyl-2,5-diphenylthiophene said composition having the property of improved optical brightness.

6. A resinous composition consisting essentially of a plastic selected from the group consisting of polystyrene, a polymer of an aliphatic olefin, and a copolymer of styrene and aliphatic olefin, and from 0.01% to 1.0% based on the weight of said plastic, of a compound having the structural formula

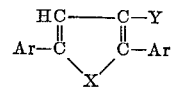

wherein X represents a member of the group consisting of sulfur, oxygen, and NH, Y represents a member of the group consisting of hydrogen and

wherein R is an alkyl radical having from 1 to about 22 carbon atoms, and Ar represents an aryl radical derived from a hydrocarbon having from 1 to 3 six-membered carbocyclic rings, said rings being fused when there is more than one ring.

7. A resinous composition consisting essentially of a plastic selected from the group consisting of polystyrene, a polymer of an aliphatic olefin, and a copolymer of styrene and aliphatic olefin, and from 0.05% to 0.2% based on the weight of said plastic, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen and $$\begin{array}{c} O \\ \| \\ -C-R \end{array}$$

wherein R is an alkyl radical having from 1 to about 22 carbon atoms, and Ar represents an aryl radical derived from a hydrocarbon having from 1 to 3 six-membered carbocyclic rings, said rings being fused when there is more than one ring.

8. A resinous composition consisting essentially of polystyrene and from 0.01% to 1.0%, based on the weight of polystyrene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen and $$\begin{array}{c} O \\ \| \\ -C-R \end{array}$$

wherein R is an alkyl radical of from 1 to about 22 carbon atoms and Ar represents an aryl radical derived from a hydrocarbon having from 1 to 3 six-membered carbocyclic rings, said rings being fused when there is more than one ring.

9. A resinous composition consisting essentially of polystyrene and from 0.05% to 0.2% based on the weight of polystyrene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen and $$\begin{array}{c} O \\ \| \\ -C-R \end{array}$$

wherein R is an alkyl radical of from 1 to about 22 carbon atoms and Ar represents an aryl radical derived from a hydrocarbon having from 1 to 3 six-membered carbocyclic rings, said rings being fused when there is more than 1 ring.

10. A resinous composition consisting essentially of polyethylene and from 0.01% to 1.0% based on the weight of polyethylene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen and $$\begin{array}{c} O \\ \| \\ -C-R \end{array}$$

wherein R is an alkyl radical of from 1 to about 22 carbon atoms, and Ar represents an aryl radical derived from a hydrocarbon having from 1 to 3 six-membered carbocyclic rings, said rings being fused when there is more than one ring.

11. A resinous composition consisting essentially of polyethylene and from 0.05% to 0.2% based on the weight of polyethylene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen, and $$\begin{array}{c} O \\ \| \\ -C-R \end{array}$$

wherein R is an alkyl radical of from 1 to about 22 carbon atoms and Ar represents an aryl radical derived from a hydrocarbon having from 1 to 3 six-membered carbocyclic rings, said rings being fused when there is more than 1 ring.

12. A resinous composition consisting essentially of polypropylene and from 0.01% to 1.0% based on the weight of polypropylene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen and $$\begin{array}{c} O \\ \| \\ -C-R \end{array}$$

wherein R is an alkyl radical of from 1 to about 22 carbon atoms and Ar represents an aryl radical derived from a hydrocarbon having from 1 to 3 six-membered carbocyclic rings, said rings being fused when there is more than one ring.

13. A resinous composition consisting essentially of polpropylene and from 0.05% to 0.2% based on the weight of polypropylene, of a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen, and $$\begin{array}{c} O \\ \| \\ -C-R \end{array}$$

wherein R is an alkyl radical of from 1 to about 22 carbon atoms and Ar represents an aryl radical derived from a hydrocarbon having from 1 to 3 six-membered carbocyclic rings, said rings being fused when there is more than one ring.

14. A process for optically brightening polyolefins which comprises melt blending at an elevated temperature of polyolefin with a compound having the structural formula $$\begin{array}{c} HC\text{———}C-Y \\ \| \quad\quad \| \\ Ar-C \quad\quad C-Ar \\ \diagdown X \diagup \end{array}$$

wherein X represents a member of the group consisting of sulfur, oxygen, and NH, Y represents a member of the group consisting of hydrogen, and $$\begin{array}{c} O \\ \| \\ -C-R \end{array}$$

wherein R is an alkyl radical having from 1 to about 22 carbon atoms, and Ar represents an aryl radical derived from a hydrocarbon having from 1 to 3 six-membered carbocyclic rings, said rings being fused when there is 15. A process for optically brightening polyolefins which comprises melt blending at an elevated temperature a polyolefin with a compound having the structural formula

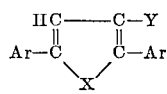

wherein X represents a member of the group consisting of sulfur, oxygen, and NH, Y represents a member of the group consisting of hydrogen and

wherein R is an alkyl radical having from 1 to about 22 carbon atoms, and Ar represents an aryl radical derived from a hydrocarbon having from 1 to 3 six-membered carbocyclic rings, said rings being fused when there is more than one ring, in an amount of from 0.05% to 0.2% based on the weight of the polyolefin.

16. A process for optically brightening polystyrene which comprises adding to styrene monomer a compound having the structural formula

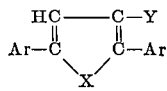

wherein X represents a member of the group consisting of sulfur, oxygen, and NH, Y represents a member of the group consisting of hydrogen and

wherein R is an alkyl radical having from 1 to about 22 carbon atoms, and Ar represents an aryl radical derived from a hydrocarbon having from 1 to 3 six-membered carbocyclic rings, said rings being fused when there is more than one ring, in the amount of from 0.01% to 1.0% based on the weight of the sytrene monomer, and polymerizing in the presence of a polymerization catalyst for several hours at an elevated temperature.

17. A process for optically brightening polystyrene which comprises adding to styrene monomer a compound having the structural formula

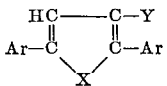

wherein X represents a member of the group consisting of sulfur, oxygen, and NH, Y represents a member of the group consisting of hydrogen and

wherein R is an alkyl radical having from 1 to about 22 carbon atoms, and Ar represents an aryl radical derived from a hydrocarbon having from 1 to 3 six-membered carbocyclic rings, said rings being fused when there is more than one ring, in the amount of from 0.05% to 0.2% based on the weight of the styrene monomer, and polymerizing in the presence of a polymerization catalyst for several hours at an elevated temperature.

18. A process for optically brightening polyethylene which comprises melt blending polyethylene with 0.01% to 1.0%, based on the weight of the polyethylene, of 2,5-diphenylthiophene at a temperature of from about 275° to 300° F.

19. A process for optically brightening polyethylene which comprises melt blending polyethylene with 0.05% to 0.2% based on the weight of the polyethylene, of 2,5-diphenylene at a temperature of from about 275° to 300° F.

20. A process for optically brightening polypropylene which comprises melt blending polypropylene with 0.01% to 1.0%, based on the weight of the polypropylene, of 2,5-diphenylthiophene at a temperature of from about 330° to 340° F.

21. A process for optically brightening polypropylene which comprises melt blending polypropylene with 0.05% to 0.2%, based on the weight of the polypropylene, of 2,5-diphenylthiophene at a temperature of from about 330° to 340° F.

22. A process for optically brightening polystyrene which comprises adding to styrene monomer 0.01% to 1.0%, based on the weight of the styrene monomer, of 3-acetyl-2,5-diphenylthiophene and polymerizing in the presence of benzoyl peroxide as catalyst for several hours at a temperature below 100° C.

23. A process for optically brightening polystyrene which comprises adding styrene monomer 0.05% to 0.2%, based on the weight of the sytrene monomer, of 3-acetyl-2,5-diphenylthiophene and polymerizing in the presence of benzoyl peroxide as catalyst for several hours at a temperature below 100° C.

24. A process for optically brightening polystyrene which comprises adding to styrene monomer 0.01% to 1.0%, based on the weight of the styerene monomer, of 2,5-diphenylpyrrole and polymerizing in the presence of benzoyl peroxide as catalyst for several hours at a temperature below 100° C.

25. A process for optically brightening polystyrene which comprises adding to styrene monomer 0.05% to 0.2%, based on the weight of the styrene monomer, of 2,5-diphenylpyrrole and polymerizing in the presence of benzoyl peroxide as catalyst for several hours at a temperature below 100° C.

References Cited by the Examiner

UNITED STATES PATENTS

| | | | |
|---|---|---|---|
| 2,852,503 | 9/1958 | Long et al. | 252—301.2 |
| 2,915,534 | 12/1959 | Long et al. | 252—301.2 |
| 2,986,528 | 5/1961 | Siegrist et al. | 252—301.2 |
| 2,995,564 | 8/1961 | Duennenberger et al. | 252—301.2 |
| 3,005,779 | 10/1961 | Ackermann et al. | 252—301.2 |

TOBIAS E. LEVOW, *Primary Examiner.*

MAURICE A. BRINDISI, *Examiner.*